US011518863B2

(12) United States Patent
Vijay

(10) Patent No.: US 11,518,863 B2
(45) Date of Patent: Dec. 6, 2022

(54) ALDEHYDE CONTENT REDUCTION PROCESS AND RECYCLED POLYOLEFIN WITH LOW ALDEHYDE CONTENT

(71) Applicant: BOREALIS AG, Vienna (AT)

(72) Inventor: Sameer Vijay, Linz (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 17/624,609

(22) PCT Filed: Jul. 6, 2020

(86) PCT No.: PCT/EP2020/068985
§ 371 (c)(1),
(2) Date: Jan. 4, 2022

(87) PCT Pub. No.: WO2021/004999
PCT Pub. Date: Jan. 14, 2021

(65) Prior Publication Data
US 2022/0204719 A1    Jun. 30, 2022

(30) Foreign Application Priority Data
Jul. 8, 2019    (EP) .................. 19184976

(51) Int. Cl.
C08J 11/06        (2006.01)
C08F 6/00         (2006.01)
B29B 17/02        (2006.01)
B29B 17/00        (2006.01)

(52) U.S. Cl.
CPC ........... *C08J 11/06* (2013.01); *B29B 17/0026* (2013.01); *B29B 17/02* (2013.01)

(58) Field of Classification Search
USPC ............................ 264/14, 344; 528/483, 503
See application file for complete search history.

(56) References Cited

U.S. PATENT DOCUMENTS

| 5,767,230 | A  | 6/1998 | Scarola et al. |
| 9,637,602 | B2 | 5/2017 | Potter et al. |
| 9,670,293 | B2 | 6/2017 | Reznichenko et al. |
| 9,670,347 | B2 | 6/2017 | Tölsch et al. |
| 9,708,481 | B2 | 7/2017 | Wang et al. |
| 9,745,431 | B2 | 8/2017 | Potter et al. |
| 9,751,962 | B2 | 9/2017 | Wang et al. |
| 9,777,142 | B2 | 10/2017 | Sandholzer et al. |
| 9,802,394 | B2 | 10/2017 | Cavacas et al. |
| 9,828,698 | B2 | 11/2017 | Wang et al. |
| 9,890,275 | B2 | 2/2018 | Sandholzer et al. |
| 9,976,020 | B2 | 5/2018 | Nummila-Pakarinen et al. |
| 10,011,708 | B2 | 7/2018 | Lampela et al. |
| 10,030,109 | B2 | 7/2018 | Boragno et al. |
| 10,040,930 | B2 | 8/2018 | Gloger et al. |
| 10,100,185 | B2 | 10/2018 | Wang et al. |
| 10,100,186 | B2 | 10/2018 | Wang et al. |
| 10,227,427 | B2 | 3/2019 | Reichelt et al. |
| 10,450,451 | B2 | 10/2019 | Wang et al. |
| 10,519,259 | B2 | 12/2019 | Resconi et al. |
| 10,870,718 | B2 | 12/2020 | Denifl et al. |
| 2007/0073037 | A1 | 3/2007 | Otto et al. |
| 2013/0015604 | A1 | 1/2013 | Hallaji |
| 2016/0185946 | A1 | 6/2016 | Sandholzer et al. |
| 2016/0194486 | A1 | 7/2016 | Sandholzer et al. |
| 2016/0200838 | A1 | 7/2016 | Reznichenko et al. |
| 2016/0208085 | A1 | 7/2016 | Gloger et al. |
| 2016/0229158 | A1 | 8/2016 | Cavacas et al. |
| 2016/0237270 | A1 | 8/2016 | Wang et al. |
| 2016/0244539 | A1 | 8/2016 | Resconi et al. |
| 2016/0272740 | A1 | 9/2016 | Wang et al. |
| 2016/0280899 | A1 | 9/2016 | Töltsch et al. |
| 2016/0304681 | A1 | 10/2016 | Potter et al. |
| 2016/0311951 | A1 | 10/2016 | Reichelt et al. |
| 2016/0311988 | A1 | 10/2016 | Potter et al. |
| 2016/0312018 | A1 | 10/2016 | Vestberg et al. |
| 2016/0312019 | A1 | 10/2016 | Lampela et al. |
| 2016/0347943 | A1 | 12/2016 | Wang et al. |
| 2016/0347944 | A1 | 12/2016 | Wang et al. |

(Continued)

FOREIGN PATENT DOCUMENTS

| DE | 19503053 A1 | 8/1996 |
| WO | WO 97/005186 A1 | 2/1997 |

(Continued)

OTHER PUBLICATIONS

Bader, "A Systematic Approach to Standard Addition Methods in Instrumental Analysis," *J Chem Educ* 57(10): 703-706 (1980).
Busico et al., "Alk-1-ene Polymerization in the Presence of a Monocyclopentadienyl Zirconium(IV) Acetamidinate Catalyst: Microstructural and Mechanistic Insights," *Macromol. Rapid Commun.* 28: 1128-1134 (2007).
Cheng, "$^{13}$C NMR Analysis of Ethylene-Propylene Rubbers," *Macromolecules* 17: 1950-1955 (1984).
*Coulson and Richardsons Chemical Engineering*, vol. 2, 5$^{th}$ Edition: Particle Technology And Separation Processes Chemical Engineering, Chapter 4, "Flow of Fluids through Granular Beds and Packed Columns," pp. 191-215 (Jul. 31, 2002).

(Continued)

*Primary Examiner* — Terressa Boykin
(74) *Attorney, Agent, or Firm* — Leydig, Voit & Mayer, Ltd.

(57) ABSTRACT

Disclosed is a process for treating plastic waste chips containing a blend of polypropylene and polyethylene in an amount of at least 83.0 wt.-% to less than 100 wt.-% and further containing C7 to C11 aldehydes in an amount of 8000 ppb to 20000 ppb and limonene in an amount of 5 ppm to 500 ppm, the process comprising subjecting said plastic waste chips, in a fixed bed without stirring under standard pressure or reduced pressure, to a gas flow for achieving a Reynolds number in the range of 35 to 1200 at a temperature in the range of 20° C. to a point 10° C. below the Vicat softening point (10N, ISO 306) of said plastic waste and recovering the treated plastic waste chips containing C7 to C11 aldehydes in a total amount of 50 ppb to less than 5000 ppb limonene in an amount of 0.5 to 5 ppm.

16 Claims, No Drawings

(56) References Cited

U.S. PATENT DOCUMENTS

| | | |
|---|---|---|
| 2017/0009068 A1 | 1/2017 | Kahlen et al. |
| 2017/0029980 A1 | 2/2017 | Wang et al. |
| 2017/0137617 A1 | 5/2017 | Wang et al. |
| 2017/0166711 A1 | 6/2017 | Boragno et al. |
| 2017/0218172 A1 | 8/2017 | Wang et al. |
| 2017/0313867 A1 | 11/2017 | Lampela et al. |
| 2017/0321048 A1 | 11/2017 | Nummila-Pakarinen et al. |
| 2018/0079875 A1 | 3/2018 | Braun et al. |
| 2018/0194881 A1 | 7/2018 | Denifl et al. |
| 2018/0215846 A1 | 8/2018 | Kulshreshtha et al. |
| 2020/0263015 A1 | 8/2020 | Kniesel et al. |
| 2020/0270434 A1 | 8/2020 | Van Houcke et al. |
| 2020/0277479 A1 | 9/2020 | Jerabek et al. |
| 2020/0308353 A1 | 10/2020 | Jerabek et al. |
| 2020/0308385 A1 | 10/2020 | Gahleitner et al. |
| 2020/0347216 A1 | 11/2020 | Kniesel et al. |
| 2020/0392321 A1 | 12/2020 | Gahleitner et al. |
| 2021/0114352 A1 | 4/2021 | Oderkerk et al. |
| 2021/0171749 A1 | 6/2021 | Kumar et al. |
| 2021/0171750 A1 | 6/2021 | Gahleitner et al. |
| 2021/0214527 A1 | 7/2021 | Gahleitner et al. |
| 2021/0214533 A1 | 7/2021 | Kulshreshtha et al. |
| 2021/0238376 A1 | 8/2021 | Kahlen et al. |
| 2021/0253836 A1 | 8/2021 | Gahleitner et al. |
| 2021/0269560 A1 | 9/2021 | Krallis et al. |
| 2021/0324189 A1 | 10/2021 | Prieto et al. |
| 2021/0332227 A1 | 10/2021 | Wang et al. |
| 2021/0347971 A1 | 11/2021 | Wang et al. |

FOREIGN PATENT DOCUMENTS

| | | |
|---|---|---|
| WO | WO 2011/068717 A1 | 6/2011 |
| WO | WO 2012/139967 A1 | 10/2012 |

OTHER PUBLICATIONS

Devos et al., *Standardized Human Olfactory Thresholds*, IRL Press at Oxford Press, New York, NY, "Appendix B: Standard Threshold Values," pp. 23-165 (1990).
Dunkel et al., "Nature's Chemical Signatures in Human Olfaction: A Foodborne Perspective for Future Biotechnology," Angew Chem Int Ed 53(28): 7124-7143 (2014) (cited in specification as Hoffman et al.).
Friedrich et al., "Gas Chromatograph Olfactometry (GC/O) of Dairy Products," *Intl. Dairy J.* 8(3): 235-241 (1998).
Grosch, "Determination of Potent Odorants in Foods by Aroma Extract Dilution Analysis (AEDA) and Calculation of Odor Activity Values (OAVs)," *Flavour and Fragrance J.* 9(4): 147-158 (1994).
Leonardos et al., "Odor Threshold Determinations of 53 Odorant Chemicals," *J Air Pollut Control Assoc* 19(2): 91-95 (1969).
Mostafa et al., "History, Evolution, and Optimization Aspects of Comprehensive Two-Dimensional Gash Chromatography," Chapter 4, *Comprehensive Chromatography in Combination with Mass Spectrometry*, First Edition, pp. 93-144 (2011).
Pawliszyn, "Theory of Solid-Phase Microextraction," Chapter 2, *Handbook of Solid Phase Microextraction*, pp. 13-59 (2012).
Singh et al., "Triad sequence determination of ethylene-propylene copolymers—application of quantitative $^{13}$C NMR," *Polymer Testing* 28(5): 475-479 (2009).
Tranchida et al., "Comprehensive Two-Dimensional Gas Chromatography Combined with Mass Spectrometry," Chapter 6, *Comprehensive Chromatography in Combination with Mass Spectrometry*, First Edition, pp. 171-242 (2011).
Van Gemert, *Odour Thresholds. Compilations of Odor Threshold Values in Air, Water and Other Media*, Oliemans Punter & Partner BV, Utrecht, pp. 231, 268-269, 295, 288-289, 323-3324, 327, 358 (2003).
Wang et al., "Structural Analysis of Ethylene/Propylene Copolymers Synthesized with a Constrained Geometry Catalyst," *Macromolecules* 33: 1157-1162 (2000).
Zhou et al., "A new decoupling method for accurate quantification of polyethylene copolymer composition and triad sequence distribution with $^{13}$C NMR," *J. Magnet. Reson.* 187: 225-233 (2007).
European Patent Office, Extended European Search Report in European Patent Application No. 19184976.9 (dated Jan. 2, 2020).
European Patent Office, International Search Report in International Application No. PCT/EP2020/068985 (dated Nov. 12, 2020).
European Patent Office, Written Opinion in International Application No. PCT/EP2020/068985 (dated Nov. 12, 2020).
U.S. Appl. No. 14/914,501, filed Feb. 25, 2016.
U.S. Appl. No. 14/911,295, filed Feb. 10, 2016.
U.S. Appl. No. 14/911,300, filed Feb. 10, 2016.
U.S. Appl. No. 14/911,299, filed Feb. 10, 2016.
U.S. Appl. No. 15/022,671, filed Mar. 17, 2016.
U.S. Appl. No. 15/030,556, filed Apr. 19, 2016.
U.S. Appl. No. 15/022,664, filed Mar. 17, 2016.
U.S. Appl. No. 15/029,493, filed Apr. 14, 2016.
U.S. Appl. No. 15/027,129, filed Apr. 4, 2016.
U.S. Appl. No. 15/101,837, filed Jun. 3, 2016.
U.S. Appl. No. 15/106,101, filed Jun. 17, 2016.
U.S. Appl. No. 15/103,783, filed Jun. 10, 2016.
U.S. Appl. No. 15/039,107, filed May 25, 2016.
U.S. Appl. No. 15/103,744, filed Jun. 10, 2016.
U.S. Appl. No. 15/102,628, filed Jun. 8, 2016.
U.S. Appl. No. 15/113,907, filed Jul. 25, 2016.
U.S. Appl. No. 15/113,922, filed Jul. 25, 2016.
U.S. Appl. No. 15/113,517, filed Jul. 22, 2016.
U.S. Appl. No. 15/115,929, filed Aug. 2, 2016.
U.S. Appl. No. 15/310,283, filed Nov. 10, 2016.
U.S. Appl. No. 15/514,641, filed Mar. 27, 2017.
U.S. Appl. No. 15/531,974, filed May 31, 2017.
U.S. Appl. No. 15/526,957, filed May 15, 2017.
U.S. Appl. No. 15/566,588, filed Oct. 13, 2017.
U.S. Appl. No. 15/741,861, filed Jan. 4, 2018.
U.S. Appl. No. 16/633,699, filed Jan. 24, 2020.
U.S. Appl. No. 16/761,743, filed May 5, 2020.
U.S. Appl. No. 16/761,757, filed May 5, 2020.
U.S. Appl. No. 16/652,115, filed Mar. 30, 2020.
U.S. Appl. No. 16/763,014, filed May 11, 2020.
U.S. Appl. No. 16/763,001, filed May 11, 2020.
U.S. Appl. No. 16/768,330, filed May 29, 2020.
U.S. Appl. No. 16/982,385, filed Sep. 18, 2020.
U.S. Appl. No. 17/050,550, filed Oct. 26, 2020.
U.S. Appl. No. 17/052,233, filed Nov. 2, 2020.
U.S. Appl. No. 17/047,350, filed Oct. 13, 2020.
U.S. Appl. No. 15/733,971, filed Dec. 1, 2020.
U.S. Appl. No. 16/973,673, filed Dec. 9, 2020.
U.S. Appl. No. 17/259,216, filed Jan. 11, 2021.
U.S. Appl. No. 17/273,687, filed Mar. 4, 2021.
U.S. Appl. No. 17/273,700, filed Mar. 4, 2021.
U.S. Appl. No. 17/273,711, filed Mar. 4, 2021.
U.S. Appl. No. 17/276,275, filed Mar. 15, 2021.
U.S. Appl. No. 17/276,322, filed Mar. 15, 2021.
U.S. Appl. No. 17/413,612, filed Jun. 14, 2021.
U.S. Appl. No. 17/622,891, filed Dec. 27, 2021.
U.S. Appl. No. 17/623,657, filed Dec. 29, 2021.
China National Intellectual Property Administration, First Office Action in Chinese Patent Application No. 202080049126.1 (dated May 16, 2022).
Intellectual Property India, Office Action in Indian Patent Application No. 202217005406 (dated Jun. 2, 2022).
Korean Intellectual Property Office, Written Decision on Registration issued in Korean Application No. 10-2022-7003541 (dated Sep. 1, 2022).

ALDEHYDE CONTENT REDUCTION PROCESS AND RECYCLED POLYOLEFIN WITH LOW ALDEHYDE CONTENT

CROSS-REFERENCE TO RELATED APPLICATIONS

This patent application is the U.S. national phase of International Application No. PCT/EP2020/068985, filed on Jul. 6, 2020, which claims the benefit of European Patent Application No. 19184976.9, filed Jul. 8, 2019, the disclosures of which are incorporated herein by reference in their entireties for all purposes.

The present invention relates to a process for reducing the content of aldehydes in recycling streams and further a recycled stream having a low aldehyde content.

BACKGROUND

Polyolefin waste, particularly household polyolefin waste is an attractive raw material stream for polyolefin compositions. However, such waste suffers from an extremely broad combination of substances that are present. These substances often result in malodor of recycled polyolefin compositions, which affects suitability of the recycled polyolefins for several applications and uses. These substances include for example printing inks, contamination by other plastics, wood and paper residues, glue residues and primarily food waste and microbial activity on the food waste.

In typical recycling processes, the trash material is processed and shredded to recover a shredded polyolefin rich material stream before washing the shredded materials. The purpose of the washing step is to dislodge or wash soluble and easily removable waste from the shreds. After washing, the polyolefin material stream is separated from washing water, dried and sent to an extrusion step with or without degassing ports yielding pellets. Such process still leaves unacceptable odor in the pellets as the extrusion step is not sufficient for significant removal of malodors.

It is further known to mask or trap odor substances. However, such addition does not solve the contamination with malodor containing substances as such and but leads to even further contamination.

Applicants have found that depending on the nature of the trash material, i.e. the origin thereof, the malodor causing substances differ significantly as to their composition and further as to their amount. For example some streams have been found to contain quite high amounts of C7-C11 aldehydes.

U.S. Pat. No. 5,767,230 concerns a process for removing volatiles from chips comprised of post-consumer-recycled polyolefin (PCR polyolefin), whereby the chips obtained shall be essentially free of odors. U.S. Pat. No. 5,767,230 teaches chopping of presorted polyethylenes into chips and introducing the chips into a stirred bed with aeration at superficial velocity thereby providing about 90 percent reduction in volatile impurities. In the experimental part, the reduction in content of limonene was studied alongside the reduction in content of other undesirable ingredients. However, processing under stirred bed conditions is energy-intensive and inappropriate for higher boiling contaminations. In addition to that, removal of odor does not go hand in hand with a reduction in the content of limonene. There is no literal restriction placed on the Reynolds number as occurring in U.S. Pat. No. 5,767,230, however the chips sizes and gas velocities as described therein correspond to a Reynolds number range of from 2.7 to about 18.

Thus, there is still the need for a reduction in the content of C7-C11 aldehydes being responsible for malodor from recycling streams, which is not energy intensive and applicable to a broad variety of recycling streams.

DESCRIPTION

The present invention is based on the finding that this problem can be addressed by a process wherein shredded polyolefins from recycling sources are subjected to a gas flow for an extended period of time, using a fixed bed reactor without stirring wherein the Reynolds number describing the flow of the gas through the polyolefins is within a certain range, particularly a Reynolds number range of 35 to 1200. In other words, it has been found the reduction in the content of C7-C11 aldehydes in the polyolefin is effective at a reasonable energy consumption when the Reynolds number range is from 35 to 1200.

For the purposes of the present description and of the subsequent claims, the term "recycled waste" is used to indicate a material recovered from both post-consumer waste and industrial waste, as opposed to virgin polymers. Post-consumer waste refers to objects having completed at least a first use cycle (or life cycle), i.e. having already served their first purpose; while industrial waste refers to manufacturing scrap, which does not normally reach a consumer.

Contaminations according to the present invention consist of one or more of hexanal, heptanal, octanal, nonanal, decanal, undecanal, trans-2-heptenal, trans-2-octenal, trans-2-nonenal, trans-2-decenal, trans-2-undecenal and limonene.

Polyolefins are polymers produced from ethylene and/or optionally alpha olefins and/or dienes.

Chips are irregular pieces of plastic. For the present invention, plastic waste chips denote pieces of plastic originating from plastic waste, whereby 95 wt.-%, preferably 99 wt.-% of the pieces have a length of from 0.4 to 5 cm in longest dimension and 0.02 cm to 0.3 cm thickness. Plastic waste chips having these dimensions are easily accessible via sieving.

The term gas such as used herein denotes any gas suitable for being heated up to at least 50° C. and suitable for removing the contaminates of the present invention. Suitable gases are for example nitrogen or air or mixtures thereof. Simply for cost reasons, the most preferred gas for the process of the invention is air.

The term pressure such as used herein is the pressure which is present inside the treatment vessel. When a silo is used as the most conventional treatment vessel, the pressure is to be easily measured at the free headspace, in particular at the freeboard or at the gas outlet duct on top of the silo.

Standard pressure is 1.01325 bar at an altitude of 0 m, however for the present invention the term shall have the meaning of 0.8 bar to 1.2 bar.

Reduced pressure shall mean a pressure below the standard pressure.

The definition of the treatment time depends on the presence or absence of a preheating step. In case of a preheating step, i.e. the provided plastic chips or the provided raw pellets being preheated to the desired temperature, the treatment time is the time period between the start and the stop of the gas flow, i.e. the duration of the resulting gas flow in the treatment vessel. In such case, as soon as the gas flow is started and adjusted and the gas flow proceeds through the treatment vessel, the treatment time is counted as running. In case there is no preheating, the treatment time is defined differently. The treatment time is counted as running when two criteria are fulfilled: first the desired treatment temperature of the substrate, meaning the provided plastic chips or the provided raw pellets is reached and second, the gas flow has been started. Treatment time ends when the gas flow is stopped. It further shall be mentioned that the desired temperature in the embodiment without preheating step is the same as in the embodiment including such preheating step, that is 20° C. to 10° C. below Vicat.

The Reynolds numbers for this invention can be calculated easily by using a constant bed voidage of e=0.4 for both chips and pellets as a matter of definition.

The Reynolds number for linear flow of treatment gas in a conduit is given by formula (I).

$$Re=(\rho v_s D)/\mu \quad (I)$$

where:
$\rho$ is the density of the treatment gas at the temperature used (kg/m$^3$)
$\mu$ is the dynamic viscosity of the treatment gas at the temperature used (kg/m s)
$v_s$ is the superficial velocity of the treatment gas relative to the chips or pellets, defined as Q/A where Q is the volume flow rate of the treatment gas, (m$^3$/s) and A is the cross sectional area (m$^2$) available for flow
D is the characteristic linear dimension in meter (m)

In case of flow through particles such as chips or pellets, one needs to include characteristic bed voidage and its effect. These effects are reflected by $$v_s = u_c/e \quad (II)$$

where $u_c$ is the average velocity of flow of the fluid (m/s) (excluding chips or pellets) and e is the bed voidage Further D is reflected by $e/S*(1-e)$ (III)

where S is the specific surface area of the chips or pellets (1/m), further defined as the surface area of a chip (m$^2$) or pellet divided by its volume (m$^3$).

Reference is made to Chemical Engineering Vol. 2 (5th Ed.) Coulson & Richardson 4.2.3 pp 194-196 ISBN 978-0-7506-4445-7, particularly equations 4.7 (page 195) and 4.8 (page 195) incorporated by reference herewith.

HS-SPME-GC×GC-MS denotes head space solid phase microextraction followed by comprehensive gas chromatography-mass spectrometry.

HS-SPME-GC-MS denotes head space solid phase microextraction followed by gas chromatography-mass spectrometry It has been surprisingly found that malodor of recycled polyolefins can be reduced to a minimum if plastic waste chips or raw polyolefin pellets are subjected to a gas flow such that a Reynolds number within a specific range results.

As a first embodiment there is provided a process for treating plastic waste chips containing a blend of polypropylene and polyethylene in an amount of at least 83.0 wt.-% to less than 100 wt.-% and further containing C7 to C11 aldehydes and limonene, the process comprising the steps of:
(a) providing plastic waste chips in a treatment vessel having inlet and outlet for gas at opposite sides at upper and lower part section of the treatment vessel, whereby the plastic waste chips contain
    C7 to C11 aldehydes in an amount of 8000 ppb to 20000 ppb as determined by using HS-SPME-GC×GC-MS; and further contain
    limonene in an amount of 5 ppm to 500 ppm as determined by HS-SPME-GC-MS
(b) optionally washing and drying said plastic waste chips of step (a);
(c) optionally preheating said plastic waste chips to a temperature in the range of 20° C. to a point 10° C. below the Vicat softening point (10N, ISO 306) of said plastic waste chips;
(d) subjecting said plastic waste chips, in a fixed bed without stirring under standard pressure or reduced pressure, to a gas flow for achieving a Reynolds number in the range of 35 to 1200, preferably from 100 to 900, more preferably from 150 to 800 and most preferably from 200 to 700 at a temperature in the range of 20° C. to a point 10° C. below the Vicat softening point (10N, ISO 306) of said plastic waste chips;
(e) recovering the treated plastic waste chips containing
    C7 to C11 aldehydes in a total amount of 50 ppb to less than 5000 ppb, preferably less than 4000 ppb, more preferably less than 3500 ppb as determined by using HS-SPME-GC×GC-MS and
    limonene in an amount of 0.5 to 5 ppm as determined by using HS-SPME-GC-MS;
(f) subjecting said treated plastic waste chips of step (e) to an extrusion step yielding pellets;
(g) recovering said pellets.

The pressure in the step (d) preferably is within the range of 3 to 15 mbarg.

As a second embodiment, the present invention for treating plastic waste chips containing a blend of polypropylene and polyethylene in an amount of at least 83.0 wt.-% to less than 100 wt.-% and further containing C7 to C11 aldehydes and limonene, the process comprising the steps of:
(a) providing plastic waste chips, whereby the plastic waste chips contain
    C7 to C11 aldehydes in an amount of 8000 ppb to 20.000 ppb as determined by using HS-SPME-GC×GC-MS; and further contain
    limonene in an amount of 5 ppm to 500 ppm as determined by using HS-SPME-GC-MS
(b) subjecting said plastic waste chips to an extrusion step yielding raw pellets;
(c) placing said raw pellets in a treatment vessel having inlet and outlet for gas at opposite sides at upper and lower part section of the treatment vessel;
(d) optionally preheating said raw pellets to a temperature in the range of 20° C. to a point 10° C. below the Vicat softening point (10N, ISO 306) yielding preheated raw pellets;
(e) subjecting said raw pellets or said preheated raw pellets, in a fixed bed without stirring under standard pressure or reduced pressure, to a gas flow for achieving a Reynolds number in the range of 35 to 1200 preferably from 100 to 900, more preferably from 150 to 800 and most preferably from 200 to 700; at a temperature in the range of 20° C. to a point 10° C. below the Vicat softening point (10N, ISO 306) of said plastic waste chips
(f) recovering the treated pellets of step (e) containing
    C7 to C11 aldehydes in a total amount of 50 ppb to less than 5000 ppb, preferably less than 4000 ppb, more preferably less than 3500 ppb as determined by using HS-SPME-GC×GC-MS and
    limonene in an amount of 0.5 ppm to less than 5 ppm as determined by using HS-SPME-GC-MS.

The pressure in step (e) preferably is within 3 to 15 mbarg.

It is self-explanatory that the gas flow and gas stream as well as the size of the treated polymer chips or pellets have to be adapted such that the requirement that the Reynolds number is to be within the specified range is fulfilled. The size of the treated polymer chips easily can be adjusted to meet the demands by sieving. Optionally milling steps may be used for providing adequate sizes. Usually the plastic waste chips as treated in the present invention will have a length from 0.4 to 5.0 cm in longest dimension and 0.02 to 0.3 cm thickness. It is preferred that 99 wt.-% of the plastic chips fall within these dimensions. Sieving can be used for adjusting the dimensions.

The skilled practitioner would understand that a fixed bed system, as employed in step (d) of the first embodiment, or in step (e) of the second embodiment, would consist of a bed of polymer particles, located atop a grid, through which gas is passed vertically, such as in a silo. The gas speeds involved in such fixed bed systems are typically lower than would be required for fluidized bed systems, in which the particles are suspended in the gas flow and enabling the ensemble of particles to flow in a manner similar to a liquid. For the present invention, a constant bed voidage of e=0.4 is assumed for a fixed bed which is also well supported by literature.

The process according to present invention is characterized by the recovered pellets having an odor activity value (as described in the experimental part) of less than 4000 as derived from the sum of heptanal, octanal, nonanal, decanal, undecanal, t-2-heptanal, t-2-octanal, t-2-nonenal, t-2-decenal, t-2-undecenal.

The optional preheating of step (c) of the first embodiment and (d) of the second embodiment can be achieved by any method commonly used in the art, as would be understood by the skilled practitioner.

The skilled practitioner would further understand that the extruder of step (f) of the first embodiment, or step (b) of the second embodiment, can be any extruder routinely employed in the art. Some examples of such extruders are single screw extruders or co-rotating twin screw extruders.

Whilst it may be envisaged that any suitably unreactive gas may be used in the process of the present invention, the gas used in said process is preferably air.

The gas exiting the treatment vessel is preferably subjected to a step of eliminating contamination yielding a purified gas. In a preferred embodiment, this purified gas is fed back into the treatment vessel. Such recycling of the treatment gas rules out odor nuisance of such treatment plants and further enables the use of gases other than air by avoiding excessive costs. Moreover, when the gas exiting the treatment vessel is subjected to a step of eliminating contamination yielding a purified gas and this purified gas is fed back into the treatment vessel, the energy loss in form of heat is minimized without the use of heat exchangers and the like.

In a particularly preferred embodiment, the elimination of the contaminations is carried out by local cooling within the gas stream of the gas to be purified. In a further preferred aspect, the removed heat from said local cooling is used for heating air to be fed back into the treatment vessel. A person skilled in the art will understand this can be achieved easily via the use of a heat exchanger and/or heat pump. In a particular preferred aspect, the heat removed from the gas exiting the treatment vessel is transferred to the gas fed to the treatment vessel as treatment gas.

In an alternative second embodiment the treatment gas is air and is simply taken from the surroundings and, following purification if required, discharged into the atmosphere. For reducing the energy demand, the air exiting the treatment vessel is preferably conducted through a heat exchanger. The recovered heat is transferred to the air taken from the surroundings. This allows a prewarming of the air that is to be fed into the treatment vessel. A person skilled in the art will further understand, purification of the discharged air by condensation traps allows recovery of the heat via use of a heat exchanger and/or a heat pump as described above for the first embodiment.

The treatment vessel according to the present invention preferably is a silo.

It is further preferred that the treatment time is up to 3 hours. Usually the treatment time will be at least for 0.5 hours, preferably 1 hour. As stated above, the treatment time does not include the time required for preheating. As far as the counting of the treatment time is concerned, reference is made to the aforesaid.

The polyolefin composition present in the plastic waste chips employed in the process of the present invention (hereafter termed 'the polyolefin composition' or 'the polyolefin composition employed in the invention' or the blend of polypropylene and polyethylene) is obtainable from waste, preferably from household waste. More preferably, the polyolefin composition or the blend of polypropylene and polyethylene according to the present invention is obtainable from waste without any prior fluidized bed treatment.

The polyolefin composition or the blend of polypropylene and polyethylene as present in the plastic waste chips includes, preferably consists of recycled waste material that is recovered from post-consumer and/or industrial waste, more preferably material recovered from post-consumer waste.

Many different kinds of polyethylene or polypropylene can be present in "recycled waste". In particular, the polypropylene fraction can comprise: isotactic propylene homopolymers, random copolymers of propylene with ethylene and/or $C_4$-$C_8$ α-olefins, heterophasic copolymers comprising a propylene homopolymer and/or at least one C2, or $C_4$-$C_8$ α-olefin copolymer and an elastomeric fraction comprising copolymers of ethylene with propylene and/or a $C_4$-$C_8$ α-olefin, optionally containing minor amounts of a diene.

Limonene is conventionally found in recycled polyolefin materials and originates from packaging applications in the field of cosmetics, detergents, shampoos and similar products. Therefore, the polyolefin composition contains limonene when the composition contains material that originates from such types of domestic waste streams.

In one embodiment, the weight ratio of polypropylene to polyethylene in the polymer composition employed in the invention is from 3:7 to 7:3. Preferably, the polyolefin composition employed in the invention is obtained from recycled waste by means of plastic recycling processes known in the art. Such recyclates are commercially available, e.g. from Corepla (Italian Consortium for the collection, recovery, recycling of packaging plastic wastes), Resource Plastics Corp. (Brampton, ON), Kruschitz GmbH, Plastics and Recycling (AT), Vogt Plastik GmbH (DE), Mtm Plastics GmbH (DE) etc. None exhaustive examples of polyethylene rich recycled materials include: DIPOLEN S (Mtm Plastics GmbH), food grade rHDPE (BIFFA PLC) and a range of polyethylene rich materials, such as e.g. HD-LM02041 from PLASgran Ltd.

In a certain preferred embodiment, the polyolefin composition employed in the invention is DIPOLEN (Mtm Plastics GmbH), such as DIPOLEN S or DIPOLEN H, preferably DIPOLEN S. DIPOLEN is obtained from domestic waste streams (i.e. it is a product of domestic recycling) for example the "yellow bag" recycling system, which operates in some parts of Germany.

The polyolefin composition employed in the invention may preferably have a relative amount of units derived from ethylene of greater than 20 wt.-%, preferably greater than 27 wt.-%, more preferably greater than 30 wt.-%, still more preferably greater than 35 wt.-%, most preferably greater than 40 wt.-% with respect to the total weight of the blend of polypropylene and polyethylene. Usually the relative amount of units derived from ethylene will not be greater than 95 wt.-%.

In addition, the polyolefin composition may preferably have relative amount of units derived from propylene of greater than 40 wt.-%, but less than 65 wt.-%, with respect to the total weight of the polyolefin composition.

The polyethylene fraction of the recycled material can preferably comprise recycled high-density polyethylene (rHDPE), recycled medium-density polyethylene (rMDPE), recycled low-density polyethylene (rLDPE) and the mixtures thereof. In a certain embodiment, the recycled material is high density PE with an average density of greater than 0.8 g/cm$^3$, preferably greater than 0.9 g/cm$^3$, most preferably greater than 0.91 g/cm$^3$.

In second embodiment, the weight ratio of polypropylene to polyethylene in the polymer composition employed in the invention is from 9:1 to 13:7. This second embodiment concerns a polypropylene rich material. Such recyclates are commercially available, e.g. from Corepla (Italian Consortium for the collection, recovery, recycling of packaging plastic wastes), Resource Plastics Corp. (Brampton, ON), Kruschitz GmbH, Plastics and Recycling (AT), Vogt Plastik GmbH (DE), Mtm Plastics GmbH (DE) etc. None exhaustive examples of polypropylene rich recycled materials include: Purpolen® PP (Mtm Plastics GmbH), Axpoly® recycled polypropylene pellets (Axion Ltd) and PolyPropylene Copolymer (BSP Compounds). It is considered that the present invention is applicable to a broad range of recycled materials or compositions having a high content of recycled polypropylene. The polypropylene-rich recycled material may be in the form of granules. In a certain preferred embodiment, Purpolen® PP (Mtm Plastics GmbH) is used.

In a further embodiment, the plastic waste chips, more preferably the polyolefin composition in the plastic waste chips, contain(s):
(i) less than 6.0 wt.-% polystyrene; such as 0.1 to less than 6.0 wt.-% polystyrene
and/or
(ii) less than 3.0 wt.-% talc; such as 0.1 to less 3.0 wt.-% talc
and/or
(vii) less than 5.0 wt.-% polyamide; such as 0.1 to less than 5.0 wt.-% polyamide
and/or
(viii) less than 3.0 wt.-% chalk; such as 0.1 to less than 3.0 wt.-% chalk.

The present invention is further concerned with a polyolefin composition obtainable by the process of the invention, the polyolefin composition containing:
a blend of polypropylene and polyethylene in an amount of at least 83.0 wt.-% to less than 100 wt.-%, wherein the weight ratio of polypropylene to polyethylene is from 3:7 to 7:3; and
0.1 to 6.0 wt.-% polystyrene;
and/or
0.1 to 3.0 wt.-% talc;
and/or
0.1 to 5.0 wt.-% polyamide
and/or
0.1 to 3.0 wt.-% chalk;
characterized in that the polyolefin composition contains C7 to C11 aldehydes in an amount within the range of 50 ppb to less than 5000 ppb, preferably less than 4000 ppb, more preferably less than 3500 ppb as determined by using HS-SPME-GC×GC-MS and further contains limonene in an amount of 0.5 ppm to less than 5 ppm as determined by using HS-SPME-GC-MS.

All aspects discussed above with respect to the processes disclosed herein shall also apply to the polyolefin composition.

In a further embodiment The present invention is further concerned with a polyolefin composition obtainable by the process of the invention, the polyolefin composition containing:
a blend of polypropylene and polyethylene in an amount of at least 83.0 wt.-% to less than 100 wt.-%, wherein the weight ratio of polypropylene to polyethylene is from 9:1 to 13:7; and
0.1 to 6.0 wt.-% polystyrene;
and/or
0.1 to 3.0 wt.-% talc;
and/or
0.1 to 5.0 wt.-% polyamide
and/or
0.1 to 3.0 wt.-% chalk;
characterized in that the polyolefin composition contains C7 to C11 aldehydes in an amount within the range of 50 ppb to less than 5000 ppb, preferably less than 4000 ppb, more preferably less than 3500 ppb as determined by using HS-SPME-GC×GC-MS and further contains limonene in an amount of 0.5 ppm to less than 5 ppm as determined by using HS-SPME-GC-MS.

All aspects discussed above with respect to the processes disclosed herein shall also apply to the polyolefin composition.

Experimental Part
Test Methods
a) Ratio of Units Derived from C2 and C3:

The comonomer contents of the copolymer was determined by quantitative Fourier transform infrared spectroscopy (FTIR) calibrated to results obtained from quantitative 13C NMR spectroscopy.

Thin films were pressed to a thickness of between 300 to 500 μm at 190° C. and spectra recorded in transmission mode. Relevant instrument settings include a spectral window of 5000 to 400 wave-numbers (cm$^{-1}$), a resolution of 2.0 cm$^{-1}$ and 8 scans.

Quantitative $^{13}C\{^{1}H\}$ NMR spectra were recorded in the solution-state using a Bruker Avance III 400 NMR spectrometer operating at 400.15 and 100.62 MHz for $^1$H and $^{13}$C respectively. All spectra were recorded using a $^{13}$C optimised 10 mm extended temperature probehead at 125° C. using nitrogen gas for all pneumatics. Approximately 200 mg of material was dissolved in 3 ml of 1,2-tetrachloroethane-d$_2$ (TCE-d$_2$) along with chromium (III) acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225, Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra. Quantitative $^{13}C\{^1H\}$ NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed (Cheng, H. N., Macromolecules 17 (1984), 1950) and the comonomer fraction calculated as the fraction of ethylene in the polymer with respect to all monomer in the polymer: fE=(E/(P+E) The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regiodefects when needed. Integral regions were slightly adjusted to increase applicability across the whole range of encountered comonomer contents. The mole percent comonomer incorporation was calculated from the mole fraction: E [mol %]=100*fE. The weight percent comonomer incorporation was calculated from the mole fraction: E [wt %]=100* (fE*28.06)/((fE*28.06)+((1−fE)*42.08))

b) Talc and Chalk Content:

measured by Thermogravimetric Analysis (TGA); experiments were performed with a Perkin Elmer TGA 8000. Approximately 10-20 mg of material was placed in a platinum pan. The temperature was equilibrated at 50° C. for 10 minutes, and afterwards raised to 950° C. under nitrogen at a heating rate of 20° C./min. The weight loss between ca. 550° C. and 700° C. (WCO2) was assigned to CO2 evolving from CaCO3, and therefore the chalk content was evaluated as:

Chalk content=100/44×WCO2

Afterwards the temperature was lowered to 300° C. at a cooling rate of 20° C./min. Then the gas was switched to oxygen, and the temperature was raised again to 900° C. The weight loss in this step was assigned to carbon black (Wcb). Knowing the content of carbon black and chalk, the ash content excluding chalk and carbon black was calculated as:

Ash content=(Ash residue)−56/44×WCO2−Wcb

Where Ash residue is the weight % measured at 900° C. in the first step conducted under nitrogen. The ash content is estimated to be the same as the talc content for the investigated recyclates.

c) Odor OAV

There are hundreds of odorous compounds emitted from recycled PO materials. However, it is unlikely that each of these compounds contributes equally to the aroma of a complex odor mixture. One of the methods used for assessing the relative importance of an individual compound in a complex odor mixture is the odor activity value (OAV). OAV is a measure of the importance of a specific compound to the odor of a sample. The odor activity value OAV is based on the normalisation of the individual concentration of an odorous chemical substance Ci (μg/m3) by the odor concentration threshold COT,i (μg/m3) with OAVi=Ci/COT, i.

The OAV is widely used to assess the level of odor stimulation and individual odor contribution on typical odorous regions. The larger the OAV, the more likely that compound would contribute to the overall odor of a complex odor mixture. When the OAV is greater than or equal to one, the flavor component has a positive contribution to the fragrance system. The contribution becomes greater with the increase of the OAV. If the OAV is close to zero, the contribution of flavor component to the aroma of the system can be ignored.

REFERENCES

Friedrich, J. E., T. E. Acree. 1998. Gas chromatograph olfactometry (GC/O) of dairy products. Intl. Dairy J. 8(3): 235-241,
Grosch, W. 1994. Determination of potent odorants in foods by aroma extract dilution analysis (AEDA) and calculation of odor activity values (OAVs). Flavour and Fragrance J. 9(4): 147-158.
Devos M., Patte F., Rouault J., Laffort P., Van Gemert L. J. IRL Press at Oxford Press. Print; NY, N.Y.: 1990. Standardized Human Olfactory Thresholds.
Leonardos G., Kendall D., Barnard N. Odor threshold determinations of 53 odorant chemicals. J. Air Pollut. Control. Assoc. 1969; 19:91-95.'
T. Hoffmann et al., Angew. Chem. Int. Ed. 2014, 53, 7124-7143
van Gemert L J (2003) Compilations of odor threshold values in air, water and other media. Oliemans Punter & Partner BV, Utrecht For the C7 to C11 aldehydes the situation is as follows.

|  | MW | Sensory threshold (μg/kg in water) |
|---|---|---|
| Heptanal | 114 | 3 |
| Octanal | 128 | 0.4 |
| Nonanal | 142 | 2.5 |
| Decanal | 156 | 0.5 |
| Undecanal | 170 | 5 |
| 2-Heptenal | 112 | 13 |
| 2-Octenal | 126 | 0.2 |
| 2-Nonenal | 140 | 0.08 |
| 2-Decenal | 154 | 0.4 |
| 2-Undecenal | 168 | 3 | d) Determination of C7 to C11 Aldehydes

Sample Preparation

Sample preparation was done for all sample analysis by head space solid phase microextraction (HS-SPME).

Solid-phase microextraction, or SPME, is a solid phase extraction sampling technique that involves the use of a fiber coated with an extracting phase, that can be a liquid (polymer) or a solid (sorbent), which extracts different kinds of analytes (including both volatile and non-volatile) from different kinds of media, that can be in liquid or gas phase.

The quantity of analyte extracted by the fibre is proportional to its concentration in the sample as long as equilibrium is reached or, in case of short time pre-equilibrium, with help of convection or agitation.

Reference is made to Pawliszyn J.: Handbook of Solid Phase Microextraction, Chemical Industry Press, 2009.

Comprehensive GC×GC-MS

This technique involves use of a single GC oven equipped with two capillary columns of different polarity.

The sample is first introduced and separated on the first capillary column. However, rather than being sent to the detector, the effluent is introduced into a second capillary column coated with a different stationary phase for further separation. The two columns are connected through a special interface called a modulator.

A modulator "cuts" the peaks from the first capillary column in small slices by using a cold and a hot jet system. The modulator allows the flow of analytes from the first column to the second column to be controlled. All the substances coming from first capillary column are trapped at the beginning of the second capillary column. By applying a hot air pulse for a given pulse time (modulation time, normally in the range between 2-8 seconds) for a short period (e.g. 350 msec), the trapped compounds are separated on the second capillary column. Normally the separation is optimized in the first capillary column, so only a slow temperature gradient of 2-3° C./min is used. The modulation frequency is chosen in a way that at least three modulations per compound are possible.

The primary column typically contains nonpolar stationary phase; therefore, separation in this column is based primarily according to molecule size and boiling point. The secondary column, which is much shorter and often narrower than the primary column, is usually coated with a more polar stationary phase to achieve orthogonality and separates according to polarity. The separation in the secondary column has to be extremely fast (a few seconds) to make sure that fractions of the first-dimension effluent are sampled frequently enough to preserve the separation accomplished in the first dimension. The effluent from the second column is directed to the detector.

Reference is made to Comprehensive chromatography in combination with mass spectrometry (Chapter 4 & 6)/Editor L. Mondello., ISBN 978 0 470 43407 9, John Wiley & Sons 2010.

In recyclate PO samples, the volatile composition can be complex and therefore demands sensitive and selective methods. GC×GC-MS is such a technique. Compared to GC-MS, the advantage of using GC×GC-MS is the ease with which positive assignment of peak identity can be made by way of database matching.

Mass selective detectors based on quadrupole mass filters with "standard" electron impact ionization (EI 70 eV) are widely used in routine analysis. They show a good compromise between sensitivity and robustness and can be used either as a universal detector in the scan mode or as a selective detector in the selected ion monitoring mode (SIM).

Quantification of Substances

The used sample preparation process based on solid phase microextraction (SPME) has limitations due to the fibre material and show some matrix dependency. To eliminate this problem in quantification of specific substance, standard addition method was used.

Standard Addition Method

Experimentally, equal volumes of the sample solution are taken, all but one are separately 'spiked' with known and different amounts of the analyte, and all are then diluted to the same volume. The instrument signals are then determined for all these solutions and the results plotted. As usual, the signal is plotted on the y-axis; in this case the x-axis is graduated in terms of the amounts of analyte added (either as an absolute weight or as a concentration).

The (unweighted) regression line is calculated in the normal way, but space is provided for it to be extrapolated to the point on the x-axis at which y=0. This negative intercept on the x-axis corresponds to the amount of the analyte in the test sample.

Reference is made to: A systematic approach to standard addition methods in instrumental analysis, Morris Bader, J. Chem. Educ. 1980, 57, 10, 703 https://doi.org/10.1021/ed057p703 e) Limonene Content

This method allows figuring out the recycling nature of a raw material.

Limonene quantification was carried out using solid phase microextraction (HS-SPME-GC-MS) by standard addition.

50 mg ground samples were weighed into 20 mL headspace vials and after the addition of limonene in different concentrations and a glass-coated magnetic stir bar, the vial was closed with a magnetic cap lined with silicone/PTFE. Micro capillaries (10 pL) were used to add diluted limonene standards of known concentrations to the sample. Addition of 0, 2, 20 and 100 ng equals 0 mg/kg, 0.1 mg/kg, 1 mg/kg and 5 mg/kg limonene, in addition standard amounts of 6.6 mg/kg, 11 mg/kg and 16.5 mg/kg limonene were used in combination with some of the samples tested in this application. For quantification, ion-93 acquired in SIM mode was used. Enrichment of the volatile fraction was carried out by headspace solid phase microextraction with a 2 cm stable flex 50/30 pm DVB/Carboxen/PDMS fibre at 60° C. for 20 minutes. Desorption was carried out directly in the heated injection port of a GCMS system at 270° C.

GCMS Parameters:
Column: 30 m HP 5 MS 0.25*0.25
Injector: Splitless with 0.75 mm SPME Liner, 270° C.
Temperature program: −10° C. (1 min)
Carrier gas: Helium 5.0, 31 cm/s linear velocity, constant flow
MS: Single quadrupole, direct interface, 280° C. interface temperature
Acquisition: SIM scan mode
Scan parameter: 20-300 amu
SIM Parameter: m/Z 93, 100 ms dwell time f) Particle Size of Plastic Waste Chips
PE or PP flakes—According to Annex A EN 15348:2007 or Annex E EN 15346:2007
EN 15348:2007 (Recycled plastics. Characterization of poly (ethylene terephthalate) (PET) recyclates)
EN 15346:2007 (Plastics. Recycled plastics. Characterization of poly(vinyl chloride) (PVC) recyclates)

g) Calculation of Reynolds Number
Reference—Chemical Engineering Vol. 2 (5th Ed.) Coulson & Richardson 4.2.3 pp 194-196 ISBN 978-0-7506-4445-7

For calculating Re, the packed bed is described by the following:

$e$=the fraction of the volume of the bed not occupied by solid material and is termed the fractional voidage, voidage, or porosity. It is dimensionless. Thus the fractional volume of the bed occupied by solid material is $(1-e)$.

$S$ [1/m]=the specific surface area of the particles and is the surface area of a particle divided by its volume. For a sphere, $S=6/d$ $S_b$ [1/m]=surface area presented to fluid per unit volume of the bed when the flakes are packed in a bed $S$ and $S_b$ are not equal due to the voidage which is present when the particles are packed into a bed. If point contact occurs between particles so that only a very small fraction of surface area is lost by overlapping, then:

$$S_b = S^*(1-e)$$

If the particles are randomly packed, then $e$ should be approximately constant throughout the bed and the resistance to flow the same in all directions.

$u_c$ [m/s]=average velocity of flow of the fluid, defined as $(1/A)(dV/dt)$, $A$=total cross sectional area of the bed, $V$=volume of fluid flowing in time $t$ $u_1$ [m/s]=average fluid velocity through pore channels For random packing, $u_1 = u_c/e$ and thus, Reynold's number for flow in porous channels—$Re_m = (u_c/e)(e/S^*(1-e))(\rho/\mu)$ For comparative purposes, the calculation of Reynolds numbers shall be explained with respect to U.S. Pat. No. 5,767,230 and the inventive example.

U.S. Pat. No. 5,767,230 specifies size L (length) of chips in a range of 9.525 mm-31.75 mm and a thickness of 0.398-1.5875 mm, in air using a flow velocity range of 0.27-1.2192 m/s and an air temp range of 50–120° C.

In the inventive example chips with a size L in the range of 20-50 mm at a thickness of 2-5 mm were used.

B (mm) is the width of the chips.

Specific Surface Area Calculation—

| Ref | L (mm) | B (mm) | Thickness (mm) | S (1/m) |
|---|---|---|---|---|
| US5767230 lower length | 9.525 | 1.58 | 0.398 | 6.50E+03 |
| US5767230 upper length | 31.75 | 31.75 | 1.5875 | 1.39E+03 |
| IE | 20 | 20 | 3 | 8.67E+02 |
| IE | 50 | 50 | 2 | 1.08E+03 |
| IE | 50 | 50 | 5 | 4.80E+02 |

Flow Velocity Calculation

Calculated range of the flow velocity in m/s when a vessel of a diameter of about 0.5-3 m and a height of 1-30 m is used with a volumetric flow of 30-150 m$^3$/h.

| | | Cross | Superficial velocity (m/s) | | |
|---|---|---|---|---|---|
| Vessel dia (m) | Vessel height (m) | section area (m2) | Flow at 10 m3/h | Flow at 50 m3/h | Flow at 150 m3/h |
| 0.5 | 1 | 0.2 | 50.93 | 254.65 | 763.94 |
| 1 | 10 | 7.85 | 1.27 | 6.37 | 19.10 |
| 3 | 30 | 212.06 | 0.05 | 0.24 | 0.71 |

At a constant bed voidage of e=0.4, with air as the flowing medium, the following Reynolds numbers can be calculated. Data for U.S. Pat. No. 5,767,230 is given for comparative purposes.

Reynolds Number Calculations

| Temp (° C.) | Density of air (kg/m3) | Dyn. Visc (1e6 Pa.s) | Superficial velocity (m/s) | S (1/m) | Re_m | |
|---|---|---|---|---|---|---|
| 50 | 1.093 | 19.53 | 0.27 | 6.50E+03 | 3.874 | US5767230 |
| | | | 0.27 | 1.39E+03 | 12.644 | US5767230 |
| | | | 1.27 | 3.00E+03 | 45.475 | Present invention |
| 120 | 0.88 | 22.6 | 0.27 | 6.50E+03 | 2.695 | US5767230 |
| | | | 0.27 | 1.39E+03 | 18.173 | US5767230 |
| | | | 1.27 | 3.00E+03 | 39.487 | Present invention |
| | | | 6.37 | 8.67E+02 | 685.574 | Present invention |
| 150 | 0.834 | 23.8 | 6.37 | 8.67E+02 | 476.991 | Present invention |
| | | | 19.1 | 1.08E+03 | 1032.627 | Present invention |

EXPERIMENTS

Example 1

Post-consumer plastic waste chips (abbreviated "PCW flakes") containing polyethylene and polypropylene in an amount of 90 wt.-% collected from MTM plastics and having a content of C7 to C11 aldehydes of 8210 ppb and 160 ppm limonene were sieved to collect chips of the size in the range of 4 mm to 12.5 mm. The resulting chips were split into two parts.

Part 1 was extruded in a recycling extruder into pellets (comparative example); part 2 was processed according to the process of the invention (claim 1) and then extruded into pellets in the same extruder (inventive example).

A treatment step was carried out at a temperature of 120° C. for 3 hours with hot air flow corresponding to 8 m/s at ambient pressure.

Both parts 1 and 2 were pelletized with a single-screw recycling extruder with screw diameter of 160 mm and L/D of 45. The extruder barrel temperature was maintained at 240° C.

The pellets samples collected after pelletization were cryo-milled in nitrogen to homogenize the sample, preserve the volatile odor components and to get comparable surface for the analytical tests.

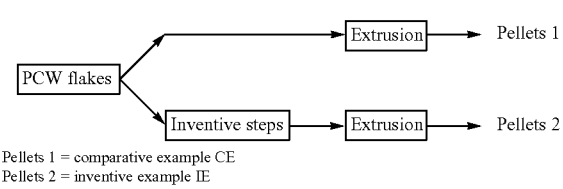

Pellets 1 = comparative example CE
Pellets 2 = inventive example IE

Conditions:
  no preheating (i.e. no step c))
  washing and drying
  fixed bed without stirring (step d))
  gas flow adjusted such that Reynolds number was 259 to 526 (step d))
  temperature 120° C. (of step d))
  treatment gas=air
  treatment time 3 h
  pressure of step (d): ambient pressure
  weight ratio PP/PE 6.8/3.2

HS-SPME

For all samples, an identical fibre and enrichment procedure was used. The fibre was 2 cm stable flex 50/30 μm coated with DVB/Carboxen/PDMS material.

The samples is weighed in a 20 mL headspace vial. For increasing the sensitivity and the reproducibility, a glass coated magnetic stir bar (5 mm length) was added to the sample. The sample vial is then sealed with a magnetic cap (lined with PTFE silicone septum).

All samples were preheated for 5 minutes at 80° C. and enrichment of the volatiles was done for 20 minutes at 80° C.

GC×GC-MS

The desorption from the fibre was done directly in the hot injection port of the GC instrument at 270° C. in splitless mode. The fibre was kept in the hot injector for 7 minutes to prevent any carry over effects.

First column used was Rxi-1HT supplied by Restek, 30 m×0.25 mm ID coated with dimethyl polysiloxane (DMPS) film of 0.25 micron thickness Second column used was BPXS supplied by SGE Analytical Science, 2.5 m×0.15 mm ID, coated with 5% Phenyl Polysilphenylene-siloxane film of 0.15 micron thickness.

A cryogenic modulator with a modulation frequency of 5 seconds was used. A heat pulse of 350 ms was applied at 280 C to release the trapped substance.

The oven temperature program (Total duration 69.83 min) for the GC×GC used was as follows:

| Rate (° C./min) | Final Temp. (° C.) | Hold time (min) |
|---|---|---|
| — | 40 | 1 |
| 3 | 230 | 0 |
| 20 | 280 | 3 |

The carrier gas used was Helium with a flow of 1.06 mL/min through the columns. A purge flow of 1 mL/min was used. A split ratio of 10 was used.

MS Program:
Electron Impact—70 eV
Ion source temp—200° C.
Interface temp—270° C.
Start time—4.1 min
End time—63 min
Scans—50 per second
Scan mode—35-300 amu.

Quantification of Aldehydes

As mentioned above, the method of standard addition allows the determination of the actual concentration of a known chemical substance. This requires the addition of a known amount of a specific chemical substance and measuring its signal.

In addition, to eliminate any negative impact of the used solvent (methanol), all samples are treated in the same way. That means standards were always added in a fixed volume of 10 μL. Even to the sample with no standard addition, the same amount of solvent was added.

Three different samples were prepared each with 20 mg of the original sample—(a) as it is, no addition, (b) with 5 ng addition, and (c) with 10 ng addition of the chemical substance of interest.

The separation of aldehydes in 1-dimensional separation is not possible due to chromatographic and mass spectral interferences. Thus, for each sample, the specific substance's peak area was obtained via comprehensive GC×GC-MS (specific extracted ion). For saturated aldehydes (C7-C11), extracted ion 44 acquired in SIM mode was used and for E-2-monounsaturated aldeyhdes (C7-C11), extracted ion 83 acquired in SIM mode was used.

Below table shows the measured concentrations of the aldehydes in the two samples.

Results:

|  | CE Pellets 1, ppb | IE Pellets 2, ppb |
|---|---|---|
| Heptanal | 370 | 206 |
| Octanal | 540 | 223 |
| Nonanal | 1220 | 1100 |
| Decanal | 478 | 372 |
| Undecanal | 370 | 117 |
| Sum (1-al) | 2978 | 2018 |
| 2-Heptenal | 235 | 98 |
| 2-Octenal | 170 | 79 |
| 2-Nonenal | 270 | 126 |
| 2-Decenal | 930 | 671 |
| 2-Undecenal | 540 | 188 |
| Sum (2-al) | 2978 | 2018 |
| total C7 to C11 aldehydes | 5123 | 3180 |

|  | CE Pellets 1, ppb | IE Pellets 2, ppb |
|---|---|---|
| starting total C7 to C11 aldehydes | 8210 | 8210 |
| starting limonene | 160 | 160 |
| resulting total C7 to C11 aldehydes | 5123 | 3180 |
| resulting limonene | n,d. | <5 |

Based on the above measured values, the odor activity values due to aldehydes can be calculated

| OAV/Sample | Sensory Treshold [μg/kg]* | Pellets 1 (CE) | Pellets 2 (IE) |
|---|---|---|---|
| Heptanal | 3 | 123 | 68 |
| Oktanal | 0.4 | 1350 | 557 |
| Nonanal | 2.5 | 488 | 440 |
| Decanal | 0.5 | 956 | 744 |
| Undecanal | 5 | 74 | 23 |
| Sum |  | 3071 | 1881 |

| OAV/sample | Sensory Treshold [μg/kg]* | Pellets 1 (CE) | Pellets 2 (IE) |
|---|---|---|---|
| t-2-Heptenal | 13 | 18 | 8 |
| t-2-Octenal | 0.2 | 850 | 396 |
| t-2-Nonenal | 0.08 | 3375 | 1573 |
| t-2-Decenal | 0.4 | 2325 | 1676 |
| t-2-Undecenal | 3 | 180 | 63 |
| Sum OAV | | 6748 | 3716 |

The above convincingly shows that present invention results in a significant reduction of malodor resulting from aldehydes.

The invention claimed is:

1. A process for treating plastic waste chips containing a blend of polypropylene and polyethylene in an amount of at least 83.0 wt.-% to less than 100 wt.-% and further containing C7 to C11 aldehydes and limonene, the process comprising the steps of:
   (a) providing plastic waste chips in a treatment vessel having inlet and outlet for gas at opposite sides at upper and lower part section of the treatment vessel, whereby the plastic waste chips contain
      C7 to C11 aldehydes in an amount of 8000 ppb to 20000 ppb as determined by HS-SPME-GC×GC-MS; and further contain
      limonene in an amount of 5 ppm to 500 ppm as determined by HS-SPME-GC-MS
   (b) optionally washing and drying said plastic waste chips of step (a);
   (c) optionally preheating said plastic waste chips to a temperature in the range of 20° C. to a point 10° C. below the Vicat softening point (10N, ISO 306) of said plastic waste chips;
   (d) subjecting said plastic waste chips, in a fixed bed without stirring under standard pressure or reduced pressure, to a gas flow for achieving a Reynolds number in the range of 35 to 1200 at a temperature in the range of 20° C. to a point 10° C. below the Vicat softening point (10N, ISO 306) of said plastic waste chips;
   (e) recovering the treated plastic waste chips containing
      C7 to C11 aldehydes in a total amount of 50 ppb to less than 5000 ppb as determined by HS-SPME-GC×GC-MS and
      limonene in an amount of 0.5 to 5 ppm as determined by HS-SPME-GC-MS;
   (f) subjecting said treated plastic waste chips of step (e) to an extrusion step yielding pellets; and
   (g) recovering said pellets.

2. The process according to claim 1, wherein the pressure of step (d) is within the range of 3 to 15 mbarg.

3. A process for treating plastic waste chips containing a blend of polypropylene and polyethylene in an amount of at least 83.0 wt.-% to less than 100 wt.-% and further containing C7 to C11 aldehydes and limonene, the process comprising the steps of:
   (a) providing plastic waste chips, whereby the plastic waste chips contain
      C7 to C11 aldehydes in an amount of 8000 ppb to 20.000 ppb as determined by HS-SPME-GC×GC-MS; and further contain
      limonene in an amount of 5 ppm to 500 ppm as determined by HS-SPME-GC-MS
   (b) subjecting said plastic waste chips to an extrusion step yielding raw pellets;
   (c) placing said raw pellets in a treatment vessel having inlet and outlet for gas at opposite sides at upper and lower part section of the treatment vessel;
   (d) optionally preheating said raw pellets to a temperature in the range of 20° C. to a point 10° C. below the Vicat softening point (10N, ISO 306) yielding preheated raw pellets;
   (e) subjecting said raw pellets or said preheated raw pellets, in a fixed bed without stirring under standard pressure or reduced pressure, to a gas flow for achieving a Reynolds number in the range of 35 to 1200; at a temperature in the range of 20° C. to a point 10° C. below the Vicat softening point (10N, ISO 306) of said plastic waste chips
   (f) recovering the treated pellets of step (e) containing
      C7 to C11 aldehydes in a total amount of 50 ppb to less than 5000 ppb and
      limonene in an amount of 0.5 ppm to less than 5 ppm as determined by HS-SPME-GC-MS.

4. The process according to claim 3, wherein the pressure of step (e) is within the range of 3 to 15 mbarg.

5. The process according to claim 1, wherein the gas is air.

6. The process according to claim 1, wherein the recovered pellets as obtained from the process have an odor activity value (as defined in the specification) of less than 4000 as derived from the sum of heptanal, octanal, nonanal, decanal, undecanal, t-2-heptanal, t-2-octanal, t-2-nonenal, t-2-decenal, t-2-undecenal.

7. The process according to claim 1, wherein the gas exiting the treatment vessel is subjected to a purification step by local cooling.

8. The process according to claim 1, wherein the treatment gas is recycled.

9. The process according to claim 1, wherein the treatment gas is discharged into the atmosphere.

10. The process according to claim 1, wherein said plastic waste chips comprise
   A-1) polypropylene and
   A-2) polyethylene,
      wherein the weight ratio of polypropylene A-1) to polyethylene A-2) is from 3:7 to 7:3 or
      wherein the weight ratio of polypropylene A-1) to polyethylene A-2) is from 9:1 to 13:7.

11. The process according to claim 1, wherein said plastic waste chips contain
   (i) 0.1 wt.-% to 6.0 wt.-% polystyrene;
   and/or
   (ii) 0.1 wt.-% to 3.0 wt.-% talc;
   and/or
   (vii) 0.1 wt.-% to 5.0 wt.-% polyamide
   and/or
   (viii) 0.1 wt.-% to 3.0 wt.-% chalk.

12. The process according to claim 1, wherein said treatment vessel is a silo.

13. The process according to claim 1, wherein the gas is air and the treatment time is 0.5 to 3 hours.

14. The process according to claim 1, wherein said plastic waste chips contain a recycled material that is recovered from a waste plastic material derived from post-consumer and/or industrial waste.

15. A polyolefin composition obtained by the process of claim 1, containing
   a blend of polypropylene and polyethylene in an amount of at least 83.0 wt.-% to less than 100 wt.-%, wherein the weight ratio of polypropylene to polyethylene is from 3:7 to 7:3 or wherein the weight ratio of polypropylene to polyethylene is from 9:1 to 13:7;
and
0.1 to 6.0 wt.-% polystyrene;
and/or
0.1 to 3.0 wt.-% talc;
and/or
0.1 to 5.0 wt.-% polyamide
and/or
0.1 to 3.0 wt.-% chalk;
wherein the polyolefin composition contains
C7 to C11 aldehydes in an amount within the range of 50 ppb to less than 5000 ppb as determined by HS-SPME-GC×GC-MS and further contains limonene in an amount of 0.5 ppm to less than 5 ppm as determined by HS-SPME-GC-MS.

16. A polyolefin composition obtained by the process of claim 3, containing a blend of polypropylene and polyethylene in an amount of at least 83.0 wt.-% to less than 100 wt.-%, wherein the weight ratio of polypropylene to polyethylene is from 3:7 to 7:3 or
wherein the weight ratio of polypropylene to polyethylene is from 9:1 to 13:7;
and
0.1 to 6.0 wt.-% polystyrene;
and/or
0.1 to 3.0 wt.-% talc;
and/or
0.1 to 5.0 wt.-% polyamide
and/or
0.1 to 3.0 wt.-% chalk;
wherein the polyolefin composition contains
C7 to C11 aldehydes in an amount within the range of 50 ppb to less than 5000 ppb as determined by HS-SPME-GC×GC-MS and further contains limonene in an amount of 0.5 ppm to less than 5 ppm as determined by HS-SPME-GC-MS.

* * * * *